US00RE35351E

United States Patent [19]

Morgan

[11] E Patent Number: Re. 35,351

[45] Reissued Date of Patent: Oct. 15, 1996

[54] RIDE PLATE FOR PERSONAL WATERCRAFT

[76] Inventor: Robert D. Morgan, P.O. Box 974, Summerland, Calif. 93067

[21] Appl. No.: 360,010

[22] Filed: Dec. 20, 1994

Related U.S. Patent Documents

Reissue of:

[64] Patent No.: 5,176,548
Issued: Jan. 5, 1993
Appl. No.: 646,937
Filed: Jan. 25, 1991

[51] Int. Cl.[6] ..... B63H 11/103

[52] U.S. Cl. ..... 440/47; 440/46; 114/270

[58] Field of Search ..... 114/270, 343; 440/38, 41, 42, 43, 46, 47; 441/79

[56] References Cited

U.S. PATENT DOCUMENTS

| | | | |
|---|---|---|---|
| 2,379,834 | 7/1945 | Sharp | 440/46 |
| 3,405,526 | 10/1968 | Aschauer | 440/47 |
| 3,826,220 | 7/1974 | Jacobson | 440/42 |
| 4,002,131 | 1/1977 | Mangrum | 114/56 |
| 4,004,542 | 1/1977 | Holmes | 440/38 |
| 4,237,812 | 12/1980 | Richardson | 440/38 |
| 4,667,619 | 5/1987 | Nishida | 114/343 |
| 4,940,438 | 7/1990 | Miller | 441/79 |
| 4,964,821 | 10/1990 | Tafoya | 440/41 |
| 4,971,584 | 11/1990 | Inoue et al. | 440/46 |

FOREIGN PATENT DOCUMENTS

| | | | |
|---|---|---|---|
| 127187 | 5/1990 | Japan | 440/47 |
| 1062126 | 12/1983 | U.S.S.R. | 440/38 |

*Primary Examiner*—Thomas J. Brahan

[57] ABSTRACT

A ride plate according to this invention is adapted to be attached to the bottom of the hull of a personal watercraft. It has a forward and a rearward axial orientation along a nominal axis of forward action of the craft. The ride plate includes a channel portion having a central portion and a pair of laterally spaced apart wall members which slant away from the central portion and from each other, thereby to form an intake chamber into which the intake port opens. The channel member is open at both ends to permit debris and excess water to leave the chamber, thereby constituting a minimized source of drag. An intake grate is incorporated into the ride plate at its forward end, having a pair of generally parallel legs, each preferably having a foil cross-section, and leaving between them, and on outside of the pair, open regions through which water can flow to the chamber.

16 Claims, 2 Drawing Sheets

RIDE PLATE FOR PERSONAL WATERCRAFT

Matter enclosed in heavy brackets [ ] appears in the original patent but forms no part of this reissue specification; matter printed in italics indicates the additions made by reissue.

FIELD OF THE INVENTION

This invention relates to a ride plate for personal watercraft, whose function beneath the hull is to make available a supply of water to an impeller for propelling the watercraft and to improve the maneuvering running properties of the watercraft.

BACKGROUND OF THE INVENTION

A personal watercraft is a relatively small buoyant vessel with a hull which provides a platform on which its rider stands or sits during operation. It may but usually does not, carry more than one—at most two or three. It is a sporting vessel not intended for long voyages, or primarily for passenger transportation from place to place. Most frequently it is a recreational vehicle. It includes handle means for steadying the rider and for guiding the watercraft. It supports a motor and an impeller. The motor drives the impeller, which receives a supply of water and discharged it rearwardly as a jet to drive the watercraft along the surface of the water. The intake port to the impeller is located in the bottom of the watercraft, and the nozzle discharges into the atmosphere.

If personal watercraft were operated only at lesser velocities in smooth water, and in waters without debris, it would be adequate and permissible for the intake port simply to open directly into the water. The intake port would be beneath the water, and water would simply be drawn into the impeller system, without complications. The bottom of the hull would be sufficiently underwater to assure a source of water for the impeller.

However, this type of operation is almost precisely what a watercraft owner does not want it to do. It is not long after he buys one until the owner strives to achieve high velocities in rough water, and even in the surf. Championship riders actually "shred" the waves, driving up their slopes, into the air, and down again to fall into turbulent water. They drive these vessels along the face of a wave, often through the "tube" and even into very shallow water where there may be considerable debris and exposure to abrasion.

For this reason, personal watercraft are generally provided on their bottom with a plate commonly called a "ride plate". It functions to protect a major portion of the hull from abrasion, and also provides a chamber between it and the bottom of the hull from which the impeller draws water rather than from the body of water without an intervening barrier. Because the watercraft tends to ride up out of the water at higher velocities, frequently only the ride plate itself is submerged. It must therefore function both as part of a water supply acting as a scoop and also as a means for stabiliizng the movement of the watercraft in the water.

Ahead of the ride plate, it is customary to provide an intake grate. As its name implies it is intended to act as an intake grate to pass water to the intake chamber, and thence through the impeller and pump, and hopefully to exclude substantial debris.

To attain the very substantial velocities contemplated by riders of personal watercraft, it is evident that neither the ride plate nor the intake grate should constitute a substantial impediment to the requisite flow of water. This is a difficult task, especially because the intake grate is provided for the purpose of exclusion of material. Still, material which enters into the chamber between the bottom of the watercraft and the top of the ride plate should be kept as free as possible from debris lest the debris be drawn into the impeller. Screens cannot effectively be used, because they can clog up.

A ride plate presents yet another challenge, especially when installed on watercraft which will be used for challening maneuvers. By the term "challenging" is meant high velocity movement in circumstances where close control of the direction and orientation of the watercraft is important. Examples of these circumstances are racing, sharp turns, loops, jumps, and rides in unusual circumstances such as up and over, or along, the face of a wave. In those circumstances, skewing, side slip, and other variations from a true directed movement can be very risky to the rider and to the watercraft.

In fact, certain adverse conditions are well-known to exist and to spoil the accuracy and response of the movement of the conventional watercraft. One is commonly called "cavitation". Because ride plates rapidly pass through a stream during operation, they exert the classical responses of a plate in a rapidly moving fluid stream. The plate lifts with the craft, even assisting the lift, and the reaction with the water, especially as to sidewise or skew motion, is less responsive. This can lead to side skids, and can complicate an intended banking of the craft.

It is an object of this invention to provide a ride plate that includes an intake grate which has foil characteristics that enable passage through the water with minimal resistance, with good exclusion of debris, and protection of the vessel in the event of contact with a relatively unyielding body such as a sandy beach, or even a rocky area.

It is a further object of the invention to provide the ride plate with a bottom surface which is gently "veeed" to provide for lateral stability, which has cupped edges effective for stabilizing purposes in high speed turning maneuvers, and downwardly projecting fins which assist in high speed turns and in deep "carving" turns.

BRIEF DESCRIPTION OF THE INVENTION

A ride plate according to this invention is adapted to be attached to the bottom of the hull of a personal watercraft. It has a forward and a rearward axial orientation along a nominal axis of forwardly motion of the craft. The ride plate includes a channel portion having a central portion and a pair of laterally spaced apart wall members which slant away from the central portion and from each other, thereby to form an intake chamber into which the inlet port opens. The channel member is open at both ends to permit debris and excess water to leave the chamber, thereby constituting a minimized source of drag.

An intake grate is incorporated into the ride plate at its forward end. It comprises a pair of generally parallel legs, each preferably having a foil cross-section, and leaving between them, and on the outside of the pair, open regions through which water can flow to the chamber. The legs are capable of deflecting substantial debris without clogging, for example pieces of wood and other flotsam.

The exposed surfaces of the central portion and of the walls are importantly configured. The central portion is initially flat, and gradually and progressively changes to an obtuse V shape as it extends rearwardly, whereby to provide additional lateral stability, and hydroplaning lift, to the watercraft, especially at lesser velocities.

The walls are externally concavely cupped as they extend axially, so that at higher velocities and in a bank they provide reduced reaction to the banking movement, while the central portion exerts a greater control over it.

According to a preferred but optional feature of the invention, a pair of forward stabilizer fins are laterally space apart, and depend downwardly from the central portion. Preferably, their center surfaces are parallel to the axis, and their outer surfaces are curved for best hydrodynamic effect in turning.

According to yet another preferred but optional feature of the invention, a central rear fin adjacent to the trailing edge depends downwardly from the central portion. This fin, which is dorsal in nature, is intended to assist in setting the rear of the watercraft when a deep curving turn is to be undertaken.

The above and other features of this invention will be fully understood from the following detailed description and the accompanying drawings, in which:

DETAILED DESCRIPTION OF THE INVENTION

Figure 1:
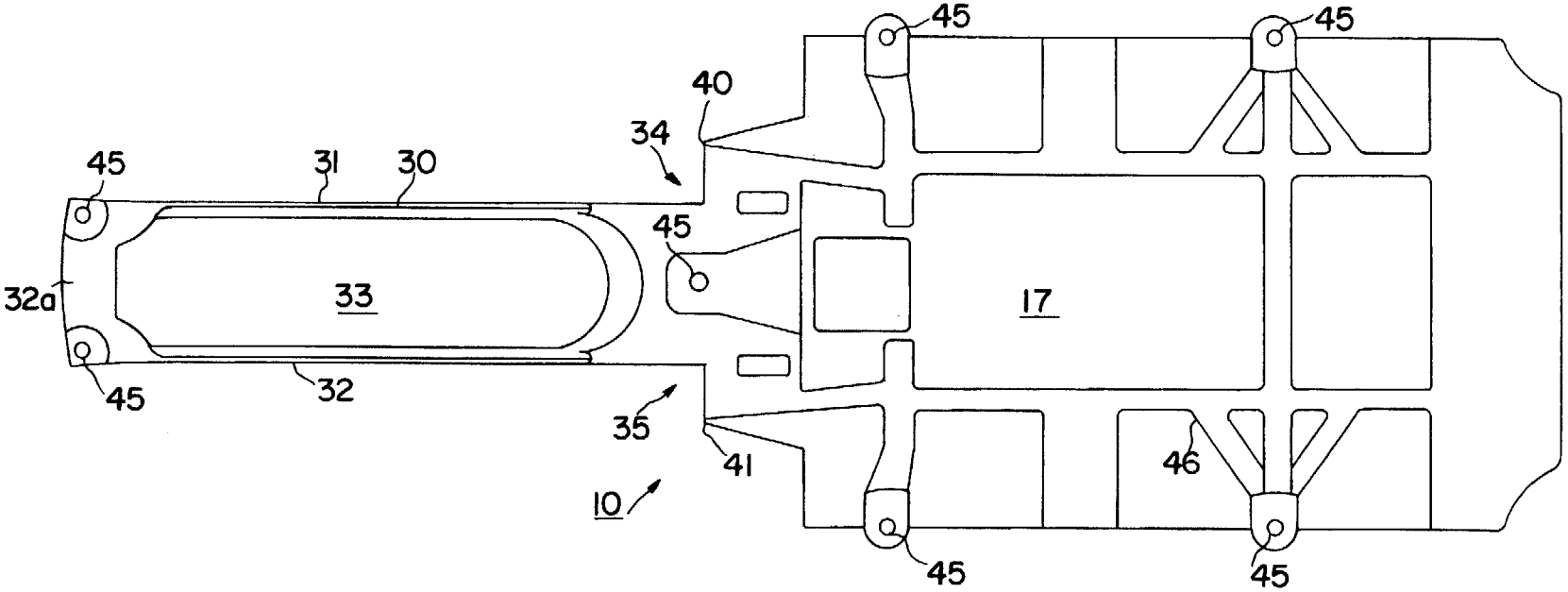
FIG. 1 is a top plan view of the ride plate, viewed from the bottom of the hull.

A ride plate 10 according to this invention is shown attached to the bottom 11 of a conventional personal watercraft. The specific details of the watercraft are important to this invention. This invention is applicable to all known embodiments of personal watercraft. For this reason, details of construction of the watercraft will be omitted in this specification except to comment that an intake port 12 opens through the bottom of its hull to receive water which will pass through an impeller (not shown). The water is withdrawn from the body of water in which the personal watercraft floats, and is discharged through a pump and a nozzle into the atmosphere to provide impulse to propel the watercraft.

Steering handles, an engine, and engine controls, also not shown, are made available for the rider's use. The bottom of the hull is generally made as a planing surface, with as many variations as there are designers. Still, they have in common a relatively flat or gently curved area which is expected to remain in the water at even the highest velocities while the hull is not flying in the air, or at least an intake chamber which receives water much as a scoop, and directs it to the intake port. This invention operates, and provided the advantage, that it can be applied to an almost unlimited range of hull bottom shapes.

Ride plate 10 has a forward end 15 and a rearward end 16, related to an arbitrary axis 16a of forward motion. It has a central portion 17 with substantial axial and lateral dimensions. Adjacent to its forward end, it has a region 18 which is nearly planar. As the central region extends rearwardly, a dihedral edge 19 arises, and the areas to each side slope in a gradually decreasing, but very obtuse, dihedral angle. Thus, the central portion becomes increasingly "V-ed". At the rear, the dihedral angle is usually about 160 degrees. This is not intended to be a sharp dihedral angle.

Two walls 21, 22 are formed, one on each side of the central region, extending axially. Each has an external "cupped" (warped) concave surface 23, 24. These surfaces make a relatively sharp angle with the central region, and flare gently as the walls extend toward the hull and away from each other.

The central region and the walls form on their inside an axially-extending intake chamber 28. The chamber extends openly without impediment from front to rear, and the intake port opens into it. Debris which enters the chamber passes out the rear, together with whatever water is not withdrawn through the intake port.

A grate 30 includes a pair of symmetrical legs 31, 32. These legs extends from the forward edge of the central region to the hull. Their forward ends are joined by a bar 32a which can be attached to the bottom of the hull. A substantial opening 33 is formed between the legs, and openings 34, 35 are formed on each side of the pair of legs. These openings give access to the forward end of the intake chamber.

Figure 6:
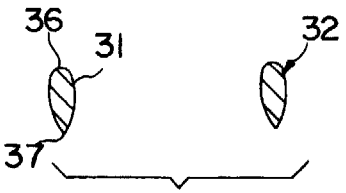
FIG. 6 is a cross-section taken at line 6—6 in FIG. 2.
Figure 3:
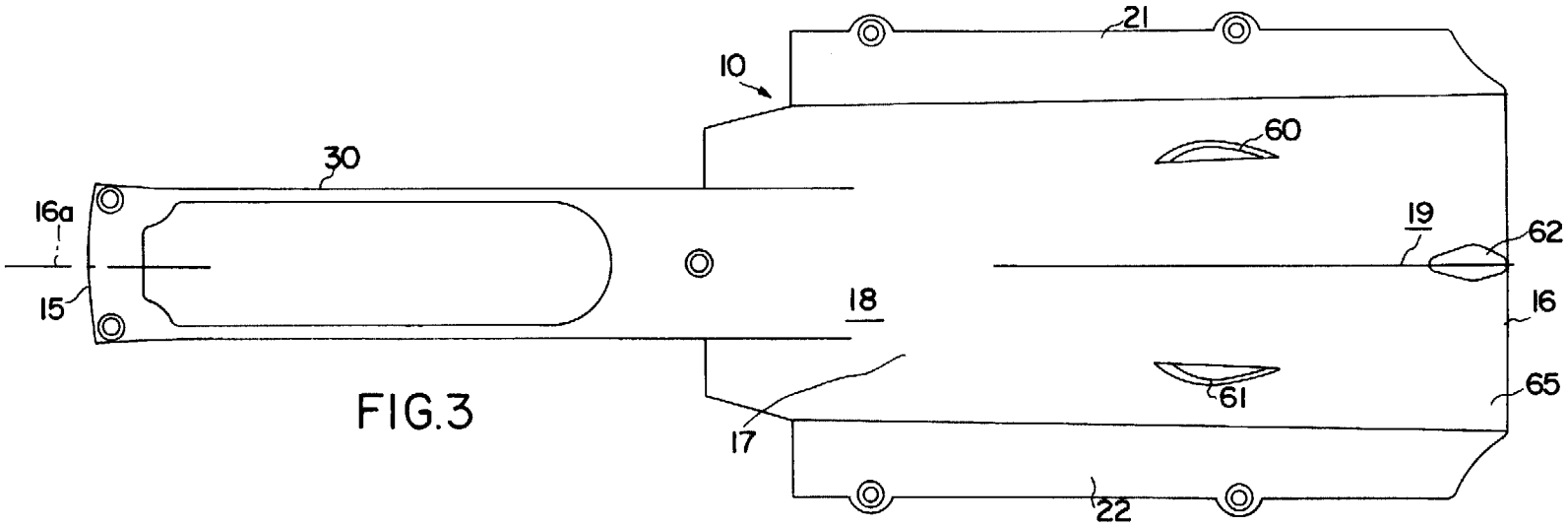
FIG. 3 is a bottom view of the ride plate, looking up toward the bottom of the hull.
Figure 2:
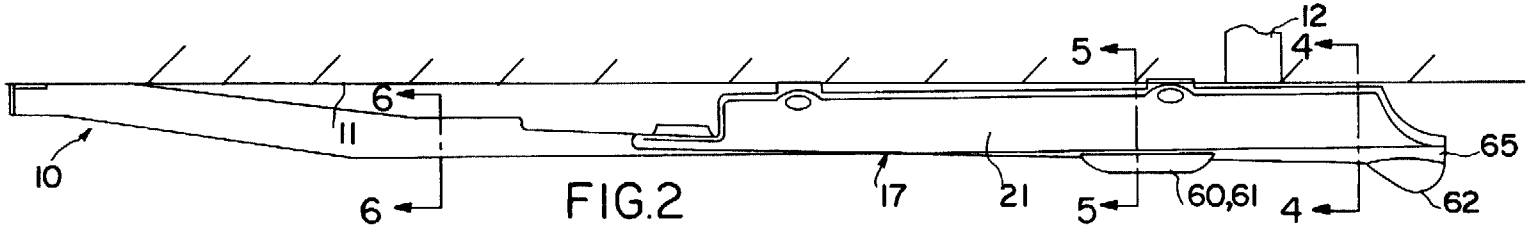
FIG. 2 is a side view of the ride plate, the other side being the mirror image.

The legs have a cross-sectional shape which preferably but not necessarily are foil-shaped, as better shown in FIG. 6. By foil-shaped is meant a hydrodynamic shape that affords least resistance to passage through the water, but still has sufficient structure and strength to withstand blows against it by flotsam, rocks, or the like. The foil-shaped cross-sections of each leg 31 or 32 as shown in FIG. 6 has a leading edge 36 and a trailing edge 37, both of which should be sharply rounded, but not so sharply as to constitute a risk of injury. The sides should be convexly curved to facilitate fluid flow over and past them.

To afford best access of fluid to the intake chamber, the forward end of the central portion is provided with forward corners 40, 41 which extend forwardly of the side walls. For reasons which are not fully understood, these forward corners, which generally "match" with their opposing hull areas, appear to reduce cavitation.

This ride plate can readily be attached to a hull. Bolt holes 45 are provided for that purpose. Its shapes materially improve the steering and stability of a watercraft. The ready entry of water into the intake chamber, and the substantial exclusion of a major debris, provide substantially advantages over known rider plates.

Figure 5:
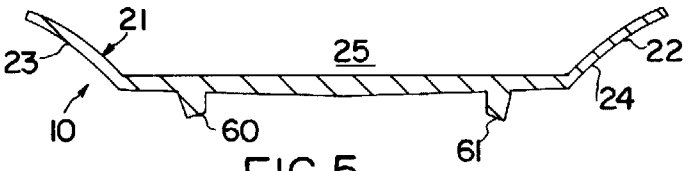
FIG. 5 is a cross-section taken at line 5—5 in FIG. 3.
Figure 4:
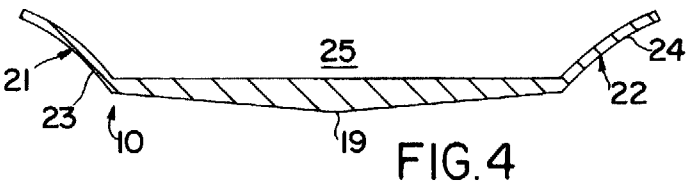
FIG. 4 is a cross-section taken at line 4—4 in FIG. 2.

The plate is preferably made of any suitable castable metal, such as an aluminum alloy of sufficient strength. Instead it could be made any suitably rigid material, even plastic, which is able to resist abrasion. The thickness is arbitrary, but is maintained as thin as possible to reduce weight. The inside of the ride plate may be provided with strengthing ribs 46 as desired. Ribs 46 and others as seen in FIG. 1 are optional. When used they are for strength and are not a significant height as regards the function of the ride plate. For this reason they are not shown in FIGS. 4 and 5.

A set of suitable dimensions is given below. The drawings are suitable for rough scaling of angles and areas. The dimensions are given in inches.

| | | |
|---|---|---|
| A-2 ½ | E-3 ½ | I-26 13/16 |
| B-2 ⅞ | F-4 ½ | |
| C-9.0 | G-1 ⅞ | |
| D-6.0 | H-1 ½ | |

The dihedral portion at the rear of the ride plate provides lateral stability at all speeds, and aids in initiating the direction of controlled turns at high speed or in deep carving turns.

It is a significant advantage to cast the grate and the remainder of the ride plate as a single body. This assures accurate alignment and a smoother surface, and facilitates attachment of the ride plate to the hull.

Two laterally spaced apart fins 60, 61 project from the central portion, each having a substantial axial length. In addition, a rear dorsal fin 62 projects from the central portion rear its rear end. It is disposed on the central axis.

The fins are optional. All three fins are preferred for riding in the surf, where the water is highly aerated. Especially the rear fin provides more bite. The forward fins contribute importantly to stability.

Although the legs on the grate need not be foil shaped, it is an improvement because it does not cause a diversion of water, nor allow air to be trapped behind the trailing edges of the legs. This improves, and even increases water flow to the impeller.

This invention is not to be limited by the embodiments shown in the drawings and described in the description, which are given by way example and not of limitation, but only in accordance with the scope of the appended claims.

I claim:

1. A one piece ride plate for an attachment to the bottom of a personal watercraft hull, said hull having an intake port to supply water to an impeller, said plate having a nominal axis of forward movement, and a front and a rear end, said plate comprising:

a central portion having a surface which is substantially planar extending from the front end of the central portion, and a dihedral edge rising at a substantial distance from the front edge of the central portion, the central portion forming a dihedral angle, with said dihedral angle gradually decreasing as it approaches the rear end of the central portion;

a wall on each side of the central portion, said walls extending away from each other as they extend laterally away from the central portion, whereby said central portion and said walls form within them, and with the hull, an intake chamber which opens at the front and rear ends of the central portion, and into which the intake port opens;

a grate comprising a pair of laterally spaced-apart legs, said legs extending from the forward edge of the central portion, and a transverse bar spaced from the central portion to which the legs are fixed, whereby openings to the intake chamber are formed between the legs, and on each side of the pair of legs;

said ride plate being adapted to be fixed to the bottom of the hull.

2. A ride plate according to claim 1 in which the external surfaces of the walls are concavely cupped.

3. A ride plate according to claim 2 in which forward corners of the central portion extend forwardly beyond the walls.

4. A ride plate according to claim 3 in which each of said legs is formed with a foil cross-section.

5. A ride plate according to claim 4 in which a pair of laterally spaced apart, forwardly extending fins project from said central portion, each having a substantial axial length.

6. A ride plate according to claim 5 in which said fins are substantially planar facing said axis, and are gently convexly curved on their other side.

7. A ride plate according to claim 6 in which a rear dorsal fin from projects the central portion near its rear end.

8. A ride plate according to claim 1 in which forward planar corners of the central portion extend forwardly beyond the walls.

9. A ride plate according to claim 1 in which each of said legs is formed with a foil cross section.

10. A ride plate according to claim 1 in which a pair of laterally spaced apart, forwardly extending fins project from said central portion, each having a substantial axial length.

11. A ride plate according to claim 10 in which said fins are substantially planar facing said axis, and are gently convexly curved on their other side.

12. A ride plate according to claim 1 in which a rear dorsal fin projects from the central portion near its rear end.

*13. A ride plate for an attachment to the bottom of a personal watercraft hull, said hull having an intake port to supply water to an impeller, said plate having a nominal axis of forward movement, and a front and rear end, wherein said ride plate being attached to the bottom of a personal watercraft hull, said plate comprising;*

*a central portion having a surface which is substantially planar extending from the front end of the central portion, and a dihedral edge rising at a substantial distance from the front edge of the central portion, the central portion forming a dihedral angle, with said dihedral angle gradually decreasing as it approaches the rear end of the central portion;*

*a wall on each side of the central portion, said walls extending away from each other as they extend laterally away from the central portion, whereby said central portion is spaced below the hull by said walls, and with said walls form within them, and with the hull, a chamber which is open at its front and rear end, said ride plate being adapted to be fixed to the bottom of the hull.*

*14. A ride plate according to claim 13 in which a pair of laterally spaced apart, forwardly extending fins project from said central portion, each having a substantial axial length.*

*15. A ride plate according to claim 14 in which said fins are substantially planar facing said axis, and are gently convexly curved on their other side.*

*16. A ride plate according to claim 13 in which a rear dorsal fin projects from the central portion near its rear end.*

* * * * *